United States Patent
Mas

[15] 3,683,256
[45] Aug. 8, 1972

[54] HIGH-CURRENT APPARATUS FOR CHARGING BATTERIES

[72] Inventor: Joseph A. Mas, 3 Maple Way, Woodbury, N.Y. 11797

[22] Filed: Oct. 23, 1970

[21] Appl. No.: 83,468

[52] U.S. Cl. ..........................320/14, 320/20, 320/46
[51] Int. Cl. ................................................H02j 7/10
[58] Field of Search..............320/14, 20, 40, 46, 4, 5; 323/22 SC; 321/45 C; 307/252 C, 293; 322/28

[56] References Cited

UNITED STATES PATENTS

| 3,559,025 | 1/1971 | Burkett et al. | 320/14 |
| 3,469,175 | 9/1969 | Kirk | 323/22 X |
| 3,348,118 | 10/1967 | Watrous | 320/40 |
| 3,427,523 | 2/1969 | Howard et al. | 320/46 |
| 3,460,019 | 8/1969 | Mas | 320/46 X |
| 3,517,293 | 6/1970 | Burkett et al. | 320/14 |

Primary Examiner—J. D. Miller
Assistant Examiner—Robert J. Hickey
Attorney—Gottlieb, Rackman & Reisman

[57] ABSTRACT

A battery charger for charging a battery by a high current under acceptance current control. The battery is periodically discharged by high-magnitude, small-width pulses to increase the acceptance current level. The discharge pulser includes two SCR's connected across the battery. The discharge pulse is initiated by turning on the first SCR. A first capacitor then functions to turn on the second SCR and a second capacitor, when the second SCR turns on, causes the first SCR to turn off. The first capacitor then charges to control the automatic turn-off of the second SCR.

10 Claims, 2 Drawing Figures

PATENTED AUG 8 1972

3,683,256

INVENTOR.
JOSEPH A. MAS
BY
Amster & Rothstein
ATTORNEYS

HIGH-CURRENT APPARATUS FOR CHARGING BATTERIES

This invention relates to apparatus for charging batteries, and more particularly to high-current battery chargers.

The concept of battery "acceptance" is described in the SAE (Society of Automotive Engineers) Journal, June, 1969, vol. 77, No. 6, pp. 31-33. The acceptance of a battery is a measure of its ability to accept and store a charge. If a charging current is supplied to a battery which is greater than the acceptance current, the excess current will not be stored but will instead result in the gassing of the electrolyte in accordance with Faraday's Laws. The acceptance current decreases exponentially as charging progresses. Therefore, to rapidly charge a battery without producing gassing, the charging current should decrease exponentially as a function of time and should follow the acceptance current curve.

In the system described in my above-identified article, a pressure transducer is provided to sense the gas evolution developed in the battery. The battery is vented so that any gas produced escapes to the atmosphere, although relatively slowly. In this manner, the pressure inside the battery is a measure of the degree to which the gassing rate exceeds a predetermined level (i.e., the degree to which the charging current exceeds the acceptance current). The signal developed by the transducer is used to control the charging current so that it follows the acceptance current curve. By providing a feedback system, the gassing can be kept so low as to have almost no deleterious effect on the battery, while at the same time the charging current can be made to follow the acceptance current curve for rapid charging. With the use of such a system, it is possible to charge an automobile battery to 80 percent of its full charge in less than half an hour.

In my copending application, Ser. No. 35,352, filed on May 7, 1970, I disclose a method and apparatus for charging batteries at rates which are significantly faster. The technique of the invention disclosed in my copending application is to discharge the battery periodically during the charging process. The periodic (high rate, short duration) discharge of a battery during the charging process, under acceptance current control, allows the battery to be charged at a very rapid rate.

As disclosed in my copending application, it is possible to charge a battery at a constant rate slightly below the initial value of the acceptance current. As the battery starts to charge and the acceptance current falls exponentially as a function of time, the charging current eventually exceeds the acceptance current. At this time there is gassing and the pressure transducer can control a high-rate discharge of the battery. A very large discharge current flows from the battery for a brief interval. Although there is a small loss of charge, the advantage of generating the discharge pulse is that the acceptance of the battery is increased above its previous level. As the charging at a constant rate continues, the acceptance current of the battery decays exponentially once again, and as soon as the acceptance current falls below the charging current level another discharge pulse occurs. In this manner, it is possible to charge a battery by a constant high current.

The higher the charging current, the greater the magnitude of the discharge pulses which should be generated to increase the acceptance of the battery. In the case of very high current chargers, the magnitude of each discharge pulse may be in the order of thousands of amperes. Commercially available transistors are not suitable for conducting such large currents; even if several transistors are placed in parallel, their cost may be prohibitive. Also, it is often found that in the absence of current balancing circuits, one of the transistors will tend to conduct more than its share of current and may be destroyed. Silicon controlled rectifiers (SCR'S), on the other hand, are capable of conducting currents in the range of thousands of amperes. However, one of the major problems with the use of SCR's in DC systems is in the design of turn off circuits; once an SCR is caused to conduct, it can be turned off only by interrupting the main anode-to-cathode flow.

It is a general object of my invention to provide a battery charger capable of discharging the battery periodically under acceptance current control with discharge pulses having magnitudes of up to even several thousand amperes.

Briefly, in accordance with the principles of my invention, the discharge pulser includes two SCR's (or equivalent semiconductor switches) connected in parallel across the battery. A first capacitor is connected in series with the anode of the first SCR, and a second capacitor is connected in series with the cathode of the second SCR. The anode of the first SCR is coupled through a resistor to the cathode of the second SCR. The first capacitor is initially discharged and the second capacitor is initially charged. A discharge pulse is initiated with the pulsing of the gate terminal of the first SCR. As the current flows through the first SCR, the first capacitor charges and the second capacitor discharges. When the second capacitor has discharged to that level which causes the second SCR to fire, a voltage step transmitted to the anode of the first SCR through the first capacitor causes it to turn off. The current now flows through the second SCR until the second capacitor charges sufficiently to turn it off. The first capacitor remains discharged and the second capacitor remains charged until another discharge pulse is required. The discharge pulse itself consists of current flowing first through the first SCR and then through the second SCR. A delay circuit is also provided for delaying the firing of the second SCR. This enables the width of the discharge pulses to be controlled.

It is a feature of my invention to provide two semiconductor switches connected in parallel across a battery for discharging the battery under acceptance current control, the two switches conducting in succession to determine the width of each discharge pulse.

Further objects, features and advantages of my invention will become apparent upon consideration of the following detailed description in conjunction with the drawing, in which.

Figure 1:
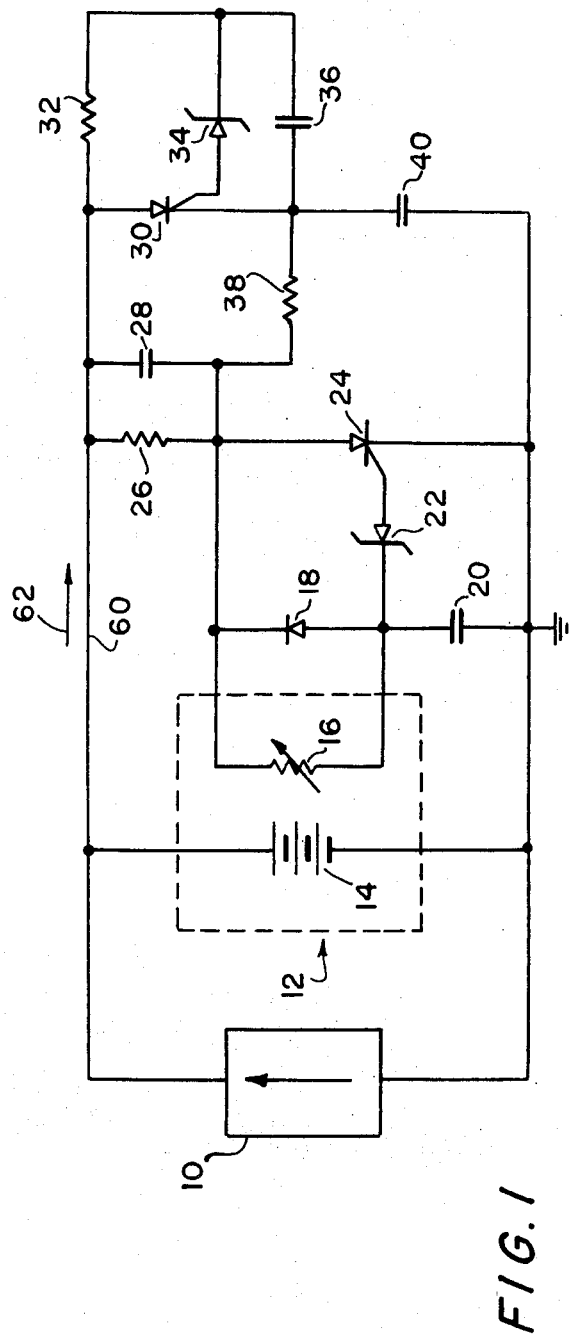
FIG. 1 depicts an illustrative embodiment of my invention.
Figure 2:
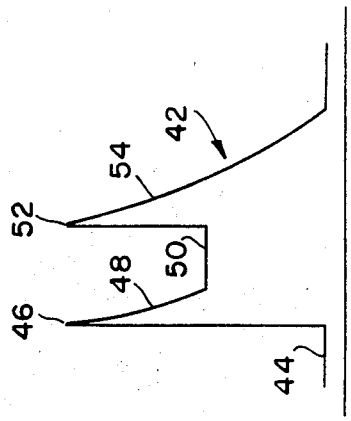
FIG. 2 depicts the waveform as a function of time of the current 62 flowing through conductor 60 in the circuit of FIG. 1.

Current source 10 is connected across the terminals of battery 14. The battery is included in a case 12 which also contains gassing rate sensor 16, which in the illustrative embodiment of the invention is a pressure transducer. As the pressure inside the vented battery case increases, the impedance of transducer 16 decreases. The remainder of the circuitry on FIG. 1 is the discharge pulser which is controlled by the impedance of transducer 16. During charging, only a very small current 62 flows through conductor 60; only a very small part of the current from source 10 is "wasted." This is shown by current level 44 in FIG. 2. It is only when a discharge pulse is necessary that a very large current flows through conductor 60, as shown by the two-pulse waveform 42 in FIG. 2. (The waveform of FIG. 2 is not drawn to scale — the peaks 46 and 52 are many times in magnitude the magnitude of level 44.)

The magnitude of the discharge current is many times greater than the magnitude of the current delivered by source 10. Consequently, when a discharge pulse is generated, not only does the total current from source 10 flow through conductor 60, but also a very large current flows from battery 14. Although it would appear that it would be preferable to turn off current source 10 whenever a discharge pulse is generated, the duration of each discharge pulse relative to the interpulse spacing is so small that the decrease in efficiency is almost negligible.

The discharge pulse rate is determined by the time constant of impedances 16 and 26, and capacitor 20. When SCR 24 is off, current flows through resistor 26, transducer 16 and capacitor 20 to ground. Resistor 26 is of very low magnitude and consequently the magnitude of the current is determined almost exclusively by transducer 16 and capacitor 20. With no gas evolution in the battery — when the current delivered by source 10 does not exceed the acceptance current level — the impedance of resistor 16 is so high that very little current flows. Capacitor 20 charges slightly but the current which leaks off the capacitor equals the charging current so that the voltage on capacitor 20 cannot increase to that point which would cause Zener diode 22 to break down. The very low current level is shown by the numeral 44 in FIG. 2.

As gas generation commences, indicating the need for a discharge pulse to increase the battery acceptance current, the impedance of transducer 16 decreases, a greater current flows through the transducer and capacitor 20, and the voltage across capacitor 20 rises. As soon as the voltage across the capacitor exceeds the breakdown potential of Zener diode 22, the Zener diode breaks down and SCR 24 turns on. A very large current flows through resistor 26 and the SCR to ground. The magnitude of the current is determined by the low impedance of resistor 26 and the low impedance of the SCR. The current in conductor 60 rapidly rises to a peak level as shown at 46 in FIG. 2. Actually, the current increases gradually from level 44 when gas generation starts and capacitor 20 starts to charge appreciably; the current then jumps to a very high level as soon as SCR 24 turns on. The gradual increase in the current between the time that gas generation commences and the time that SCR 24 fires is not shown in FIG. 2 since the increase is almost negligible compared to the very great rise in the current level when SCR 24 turns on.

As long as a low current flows through conductor 60 and resistor 26, the voltage across the resistor is relatively low and consequently the voltage across capacitor 28 is low. However, when a large current pulse flows through resistor 26, even though the resistor is low in magnitude, an appreciable voltage drop appears across it. Thus capacitor 28 charges so that the drop across it is no longer negligible.

The turning on of SCR 24, in addition to causing capacitor 28 to charge, also causes capacitors 20 and 40 to discharge. Capacitor 20 discharges through diode 18 and the SCR. At the end of each discharge pulse, as will be verified below, capacitor 40 is charged to a high level. When SCR 24 turns on, capacitor 40 starts to discharge through resistor 38 and the SCR.

Although a very large current flows through SCR 24 when it first fires, the current immediately starts to decrease as shown by segment 48 of the waveform of FIG. 2. This is due to the fact that the SCR current flows through both resistor 26 and capacitor 28 and as the capacitor charges, less current flows through the SCR since the effective voltage across the SCR which causes current to flow is equal to the potential of battery 14 less the voltage across capacitor 28. The current through conductor 60 decreases to that level which produces an IR drop across resistor 26 which just equals the voltage which if subtracted from the battery voltage leaves a potential difference across the SCR which causes the same current to flow through the SCR. At this time, the current remains constant as shown by level 50 in FIG. 2.

Although the current through SCR 24 remains constant in this manner, capacitor 40 continues to discharge through resistor 38 and the SCR. Because current flows from right to left in resistor 38, the cathode of SCR 30 is at a relatively high potential and there is an insufficient anode-cathode drop across SCR 30 to allow the SCR to fire. But as the voltage across capacitor 40 falls, eventually there is a sufficient drop across SCR 30 to allow it to turn on. The high potential at the positive terminal of battery 14 is extended through resistor 32 and Zener diode 34 to the gate of SCR 30. The Zener diode breaks down and SCR 30 turns on.

When SCR 30 turns on, the drop across it is negligible. Since the drop across capacitor 40 is similarly very small at this time, the potential difference between conductor 60 and ground is low. (The battery electromotive force, which is greater, results in an internal IR drop in the battery.) Capacitor 28 has previously charged and when SCR 30 conducts, the end of capacitor 28 connected to the anode of SCR 24 drops in potential relative to ground since the potential across a capacitor cannot change instantaneously; SCR 24 turns off. However, a very large current now flows through SCR 30 and capacitor 40 to ground. This is shown by peak 52 in the waveform of FIG. 2.

When SCR 24 turns off, a small current once again flows through resistor 26, transducer 16 and capacitor 20. Assuming that the discharge pulse has reduced the rate of gas generation in the battery, capacitor 20 does not charge to that level which causes SCR 24 to fire once again. Capacitor 28 also discharges through resistor 26 to a low level in preparation for the next discharge cycle.

Current continues to flow through SCR 30 and capacitor 40, and the capacitor starts to charge. As the capacitor voltage increases, the current decreases since there is less of a potential difference across the anode and cathode of SCR 30. The decreasing current is shown by segment 54 of waveform 42 in FIG. 2. Eventually, the current falls below the sustaining current of SCR 30 and the SCR turns off. At this time, the only current which flows through conductor 60 is that which flows through resistor 26, transducer 16 and capacitor 20 — as shown by level 44 in FIG. 2.

Actually, segments 48 and 54 in FIG. 2 have a much greater slope than is shown since capacitors 28 and 40 charge very quickly when large currents flow through SCR's 24 and 30. Thus the two spikes, represented by peaks 46 and 52 in FIG. 2, are very narrow. The major portion of each discharge pulse is that represented by level 50 in FIG. 2 — while SCR 24 is still conducting (before SCR 30 has turned on) and capacitor 40 is discharging through resistor 38 and SCR 24. The pulse duration is determined primarily by the time constant of capacitor 40 and resistor 38.

It is also possible, if desired, to design the circuit so that the overall discharge pulse consists almost entirely of current which flows to charge capacitors 28 and 40. If resistor 26 is omitted, the initial current for charging capacitor 20 flows through capacitor 28. The current just equals the leakage currents in capacitors 28 and 20 so that a substantial charge on capacitor 20 does not build up until gas evolution commences. Without resistor 26, however, when SCR 24 does fire all of the discharge current from battery 14 flows through capacitor 28 and SCR 24. The capacitor voltage would increase until the current represented by segment 48 in FIG. 2 falls to level 44 at which time SCR 24 would turn off. Capacitor 40 in such a case must discharge through resistor 38 to that level which allows SCR 30 to turn on before SCR 24 turns off, because once SCR 24 turns off capacitor 40 can no longer discharge. Thus resistor 38 should have a magnitude such that capacitor 40 is discharged to that level which allows SCR 30 to fire just prior to the time that SCR 24 would turn off automatically due to the charging of capacitor 28. In this way, SCR 30 fires just before SCR 24 would have turned off automatically — when the current in conductor 60 is slightly above level 44. The turning on of SCR 30 immediately causes SCR 24 to turn off. In effect, the waveform of FIG. 2 is changed in that segment 48 continues to fall toward level 44 with SCR 30 firing just before the level is reached; the current jumps back to the peak represented by numeral 52 without there being a constant-current segment 50. It should be noted that when SCR 30 turns on in such a case, capacitor 28 discharges through SCR 30 in the absence of resistor 26 in preparation for the next cycle. (In fact, if resistor 26 is omitted, the primary purpose for providing SCR 30 is not to provide an additional discharge pulse but rather to allow capacitor 28 to discharge so that SCR 24 can fire once again when Zener diode 22 breaks down.)

As described above, the duration of the discharge pulse is determined primarily by the time constant of capacitor 40 and resistor 38. Some additional delay can be obtained with the incorporation of capacitor 36 in the circuit. (This capacitor can be omitted if additional delay is not required.) Without capacitor 36 in the circuit, the full potential at the positive terminal of battery 14 can be extended through Zener diode 34 to the gate of SCR 30, the Zener diode breaking down as soon as capacitor 40 has discharged to a low enough level. But with capacitor 36 in the circuit, as capacitor 40 discharges current flows through resistor 32 and capacitor 36 to the junction of the capacitor, capacitor 40 and resistor 38. This current can be thought of as recharging capacitor 40 at the same time that it is discharging, or alternatively as flowing through resistor 38 and SCR 24 to ground thereby reducing the current from capacitor 40 which flows through this path. In either case, it takes a longer time for capacitor 40 to discharge to that level which allows SCR 30 to fire. It is only after capacitor 36 has charged sufficiently that Zener diode 34 breaks down and SCR 30 turns on. Capacitor 36 then discharges through resistor 32 and SCR 30 in preparation for another cycle. The use of capacitor 36 allows a small capacitor to delay the build-up of voltage at the gate of SCR 30 thereby providing a wider discharge pulse.

It is thus apparent that SCR's 24 and 30 together carry the discharge current from battery 14, the two SCR's conducting in sequence. The provision of capacitor 28 allows the firing of SCR 30 to turn off SCR 24. The provision of capacitor 40 controls the automatic turn-off of SCR 30 at the end of the pulse sequence. With the circuit of FIG. 1, it is possible to discharge a 36-volt, 200-AH battery by discharge pulses having average current values of several thousand amperes with durations of several milliseconds. Despite the fact that there are no alternating input waveforms applied to the circuit, SCR's can be used to discharge battery 13 with minimum circuitry being required to control the turn-off of the SCR's.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A battery charger for charging a battery comprising a charging source for delivering current to said battery, and means for periodically discharging said battery while it is being charged from said charging source, said discharging means including first current switch means connected across said battery for selectively conducting large currents from said battery, means for turning on said first current switch means, second current switch means connected across said battery for selectively conducting large currents from said battery, and means responsive to the turning on of said first current switch means for controlling the turning on of said second current switch means, the turning off of said first current switch means, and thereafter the turning off of said second current switch means, said controlling means including a first capacitor connected in series with said first current switch means, a second capacitor connected in series with said second current switch means, and impedance means interconnected between said first and second current switch means.

2. A battery charger in accordance with claim 1 wherein said first and second current switch means are silicon controlled rectifiers, said first capacitor is connected between the positive terminal of said battery and the anode of said first silicon controlled rectifier, said second capacitor is connected between the cathode of said second silicon controlled rectifier and the negative terminal of said battery, the cathode of said first silicon controlled rectifier being connected to the negative terminal of said battery and the anode of said second silicon controlled rectifier being connected to the positive terminal of said battery, and said impedance means is connected between the anode of said first silicon controlled rectifier and the cathode of said second silicon controlled rectifier.

3. A battery charger in accordance with claim 2 wherein said means for turning on said first silicon controlled rectifier includes means for developing a potential at the gate thereof to turn it on responsive to the generation of gas in said battery.

4. A battery charger in accordance with claim 3 wherein said means for turning on said first silicon controlled rectifier includes pressure transducer means for developing an increased potential at the gate of said first silicon controlled rectifier responsive to an increase in gas pressure in said battery.

5. A battery charger in accordance with claim 4 wherein at the end of each operation of said discharging means said second capacitor is charged to a high level to prevent conduction of said second silicon controlled rectifier, the turning on of said first silicon controlled rectifier functioning to allow said second capacitor to discharge through said impedance means and said first silicon controlled rectifier thereby allowing said second silicon controlled rectifier to turn on when the voltage across said second capacitor has discharged to a minimum value, and further including a third capacitor connected to the gate circuit of said second silicon controlled rectifier for delaying the turning on of said second silicon controlled rectifier until a time after the time when said second silicon controlled rectifier would turn on responsive only to the discharge of said second capacitor.

6. A battery charger in accordance with claim 1 wherein at the end of each operation of said discharging means said second capacitor is charged to a high level to prevent conduction of said second current switch means, the turning on of said first current switch means functioning to allow said second capacitor to discharge through said impedance means and said first current switch means thereby allowing said second current switch means to turn on when the voltage across said second capacitor has discharged to a minimum value, and further including a third capacitor connected to said second current switch means for delaying the turning on of said second current switch means until a time after the time when said second current switch means would turn on responsive only to the discharge of said second capacitor.

7. A battery charger in accordance with claim 1 wherein said means for turning on said first current switch means includes means for developing a potential at a control terminal thereof to turn it on responsive to the generation of gas in said battery.

8. A battery charger in accordance with claim 1 wherein said means for turning on said first current switch means includes pressure transducer means for developing an increased potential at the control terminal of said current switch means responsive to an increase in gas pressure in said battery.

9. A battery charger in accordance with claim 1 wherein said means for turning on said first current switch means includes means for developing a potential at a control terminal thereof to turn it on responsive to the generation of gas in said battery.

10. A battery charger in accordance with claim 1 wherein said means for turning on said first current switch means includes pressure transducer means for developing an increased potential at the control terminal of said first current switch means responsive to an increase in gas pressure in said battery.

* * * * *